(12) United States Patent
Dunn

(10) Patent No.: US 8,698,418 B2
(45) Date of Patent: Apr. 15, 2014

(54) LAMP ASSEMBLY UTILIZING LIGHT EMITTING DIODES INCLUDING HYBRID CURRENT REGULATOR SYSTEM

(75) Inventor: Timothy Dunn, Falconer, NY (US)

(73) Assignee: Truck-Lite Co., LLC, Falconer, NY (US)

( * ) Notice: Subject to any disclaimer, the term of this patent is extended or adjusted under 35 U.S.C. 154(b) by 273 days.

(21) Appl. No.: 13/270,201

(22) Filed: Oct. 10, 2011

(65) Prior Publication Data

US 2013/0088151 A1 Apr. 11, 2013

Related U.S. Application Data

(63) Continuation-in-part of application No. 11/974,255, filed on Oct. 12, 2007, now Pat. No. 8,277,092.

(51) Int. Cl.
*H05B 37/02* (2006.01)

(52) U.S. Cl.
USPC ............. 315/294; 315/32; 315/117; 315/307; 362/373

(58) Field of Classification Search
USPC .......................................................... 362/373
See application file for complete search history.

(56) References Cited

U.S. PATENT DOCUMENTS

| | | | |
|---|---|---|---|
| 7,116,086 B2 * | 10/2006 | Burgyan et al. ................ | 323/271 |
| 2008/0198615 A1 * | 8/2008 | Klipstein ....................... | 362/538 |
| 2008/0202312 A1 * | 8/2008 | Zane et al. .................... | 84/297 R |
| 2009/0187925 A1 * | 7/2009 | Hu et al. ........................ | 719/327 |
| 2009/0251068 A1 * | 10/2009 | Holec et al. ................... | 315/294 |
| 2010/0164403 A1 * | 7/2010 | Liu ................................ | 315/297 |
| 2012/0062147 A1 * | 3/2012 | Fan ............................... | 315/297 |

* cited by examiner

*Primary Examiner* — Jason M Crawford

(57) ABSTRACT

A lamp assembly is provided. The lamp assembly has a housing that functions as a heat sink for the dissipation of heat therefrom. A plurality of light emitting diodes are also present and are configured to be driven by a current regulated by a linear current regulator and a switch mode current regulator. Thus, the amount of heat generated through driving the plurality of light emitting diodes is decreased such that the housing is optimally sized and still function as a heat sink.

18 Claims, 9 Drawing Sheets

LAMP ASSEMBLY UTILIZING LIGHT EMITTING DIODES INCLUDING HYBRID CURRENT REGULATOR SYSTEM

The present application is a continuation-in-part of U.S. patent application Ser. No. 11/974,255, filed Oct. 12, 2007, now U.S. Pat. No. 8,277,092. This application relates to a lamp assembly for a vehicle. More particularly, the application relates to a lamp assembly that has light emitting diodes driven by a current source in order to increase the efficiency of a heat sink of the lamp assembly.

SUMMARY

One aspect of one embodiment is provided in a lamp assembly that has a housing with an interior portion and an exterior surface that has at least one fin for use in dissipating heat from the housing. The housing functions as a heat sink. A plurality of light emitting diodes are present and are carried by the housing. The light emitting diodes are configured to be driven by a current source regulated by a linear current regulator and a switch mode current regulator so as to reduce the amount of heat needed to be dissipated from the housing.

Figure 1:
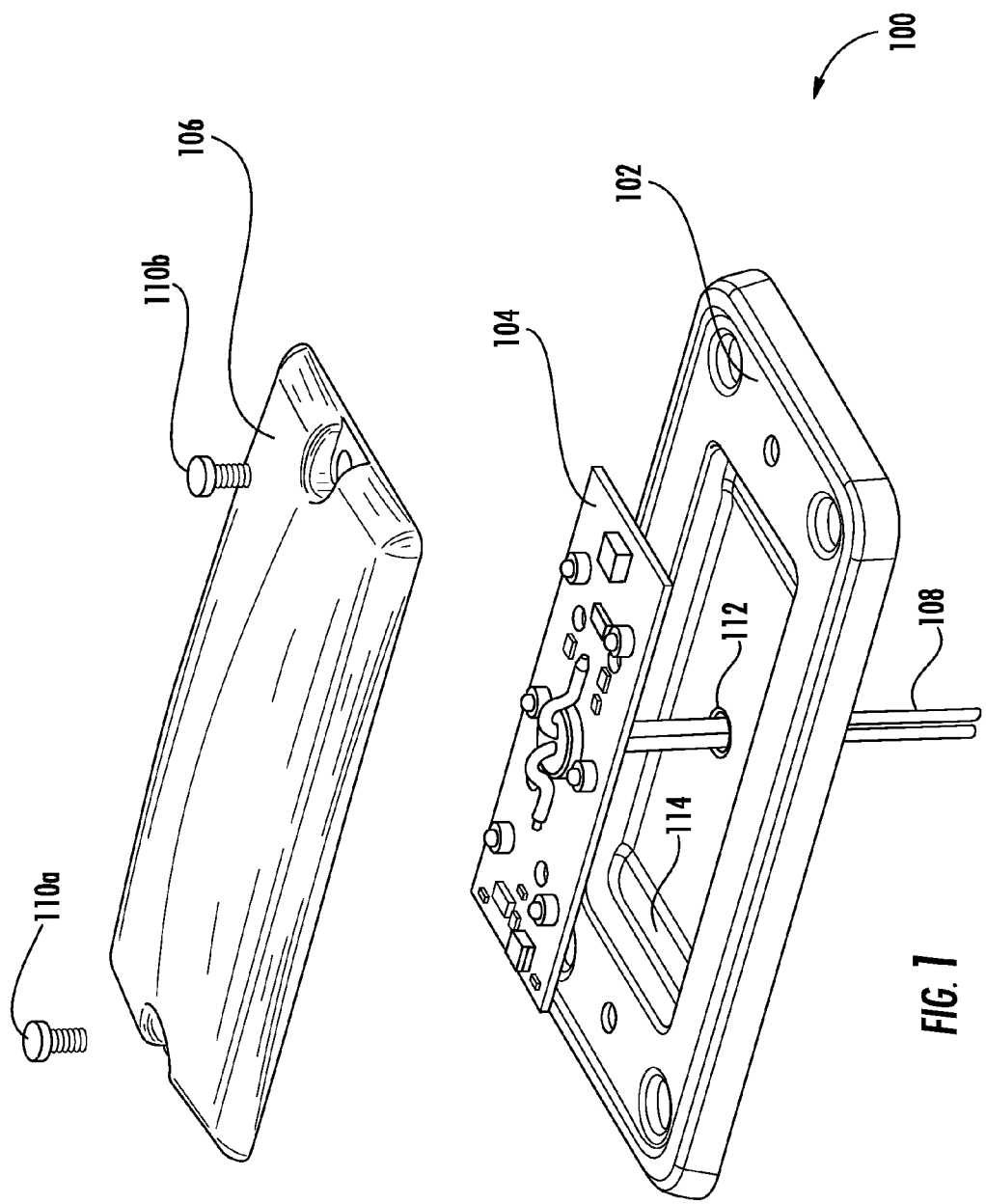
FIG. 1 is an exploded perspective view of one embodiment of a lamp assembly.

Repeat use of reference characters in the present specification and drawings is intended to represent the same or analogous features or elements.

DETAILED DESCRIPTION OF REPRESENTATIVE EMBODIMENTS

Reference will now be made in detail to embodiments of the invention, one or more examples of which are illustrated in the drawings.

FIG. 1 illustrates an exploded perspective view of one embodiment of a lamp assembly 100 for a vehicle. Lamp assembly 100 includes a housing 102, a circuit board assembly 104, an optically transmitting system 106, one or more connecting wires 108 and one or more attachment devices 110a and 110b. As shown, the attachment devices 110a and 110b are bolts. However, it is to be understood that attachment devices 110a and 110b may be any type of mechanical fastener in accordance with other embodiments. Housing 102 includes an opening 112 for wires 108 to pass through and a ledge 114 for supporting circuit board assembly 104. Circuit board assembly 104 includes various electronic components that are interconnected to form a drive circuit of lamp assembly 100. Electronic components may include a plurality of light emitting diodes (LEDs) to emit light from lamp assembly 100. In various embodiments, the plurality of LEDs may be arranged as a plurality of banks of LEDs. The drive circuit, the electronic components and their interconnections are explained in detail in conjunction with FIGS. 4-9.

Housing 102 is configured for attachment to a vehicle and provides support to circuit board assembly 104 and optically transmitting system 106. In the embodiment shown in FIG. 1, housing 102 is rectangular in shape, with a tapered structure for carrying circuit board assembly 104. In various embodiments, circuit board assembly 104 is made of a metal based material, a polymer based material or an epoxy fiberglass material. In accordance with certain embodiments circuit board assembly 104 does not include a metal core board but instead has a flame resistant (FR-4) board. Housing 102 includes opening 112 to allow connecting wires 108 to pass through. Connecting wires 108 connect circuit board assembly 104 with a power source (not shown). Housing 102 includes ledge 114 to receive circuit board assembly 104 in housing 102. In one embodiment, circuit board assembly 104 is attached to housing 102 through connection devices such as screws, nuts, bolts, rivets, couplings, fasteners, flanges, adhesive material and fastening tabs.

Optically transmitting system 106 transmits a beam of light emitted by the plurality of LEDs present on the circuit board assembly 104. In an embodiment, optically transmitting system 106 is configured to shape the beam of light emitted by the plurality of LEDs. Optically transmitting system 106 is attached to housing 102. Optically transmitting system 106 may be attached to housing 102 using attachment devices 110a and 110b. Examples of attachment devices 110a and 110b may include, but are not limited to, screws, nuts, bolts, rivets, couplings, fasteners, flanges, adhesive material and fastening tabs. Examples of optically transmitting system 106 may include, but are not limited to, a lens, a glass sheet or any other transparent medium. In the embodiment shown in FIG. 1, the face of optically transmitting system 106, such as a lens, is smooth and is exposed to the environment.

In accordance with one embodiment, lamp assembly 100 includes a thermal interface (not shown in FIG. 1) that acts as a heat sink for circuit board assembly 104. The thermal interface is made of a thermally conductive material that absorbs and dissipates heat produced from various electronic components of circuit board assembly 104. In another embodiment, housing 102 is made of the thermally conductive material. As such, various embodiments exist in which the thermal interface may or may not be present.

It is to be understood that the specific designation for lamp assembly 100 is for the convenience of the reader and is not to be construed as limiting lamp assembly 100 to specific numbers, sizes, shapes or types of housing 102, circuit board assembly 104 and optically transmitting system 106.

Figure 2:
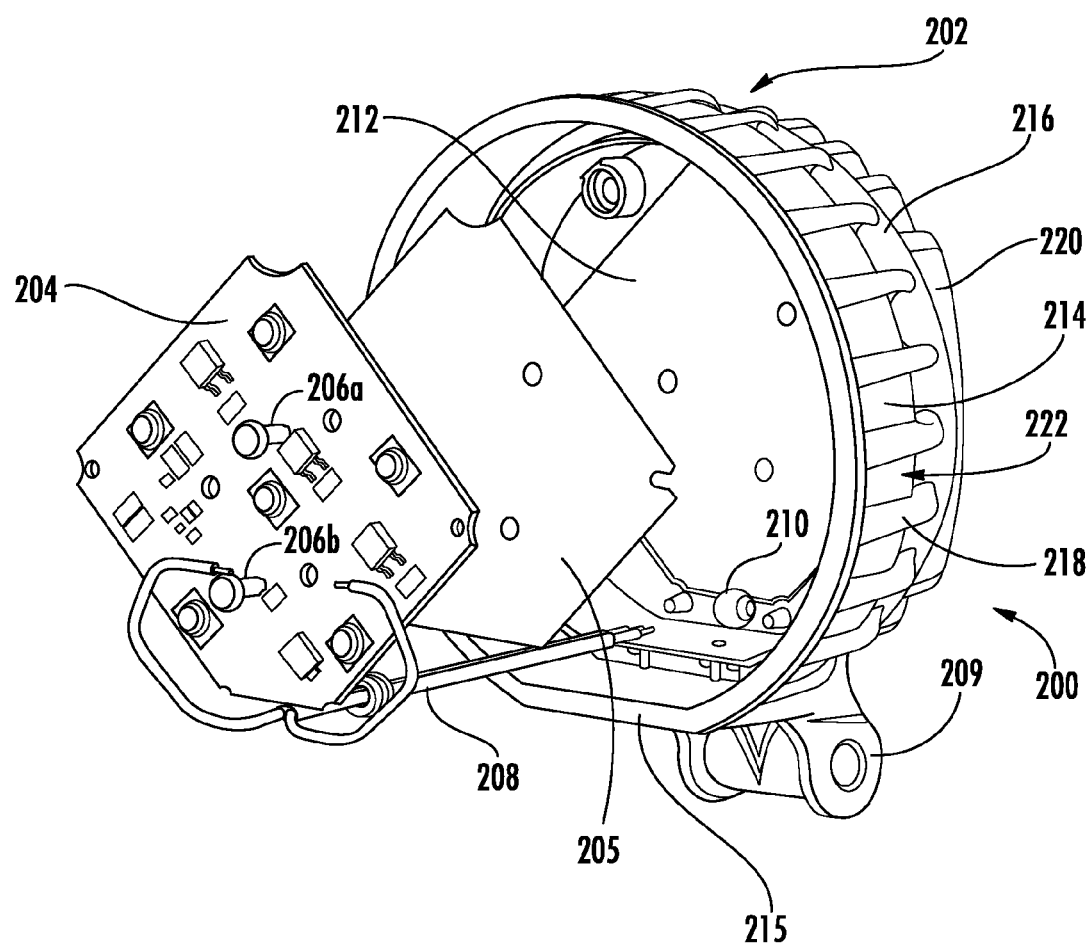
FIG. 2 is an exploded perspective view of another embodiment of the lamp assembly.

FIG. 2 illustrates an exploded perspective view of another embodiment of a lamp assembly 200 for a vehicle, which, in the embodiment shown, includes a housing 202, circuit board assembly 104, a thermal interface 205, a connection device 206 and a hinge 209.

Housing 202 is configured for attachment to the vehicle. Housing 202 supports circuit board assembly 204. In the embodiment shown in FIG. 2, housing 202 is circular in shape with a tapered structure for carrying circuit board assembly 204. Circuit board assembly 204 is connected to housing 202 through connection devices 206a and 206b. Examples of connection devices 206a and 206b may include, but are not limited to, screws, nuts, bolts, rivets, couplings, fasteners, flanges, adhesive material and fastening tabs. Circuit board assembly 204 may be attached to an interior portion 212 of the housing 202. In this regard, the circuit board assembly 204 may or may not contact the interior portion 212. For instance, the connection devices 206a and 206b may be fashioned so that the circuit board assembly 204 is spaced some distance, yet attached to, the interior portion 212. In another arrangement, the bottom of the circuit board assembly 204 may contact and rest upon the interior portion 212 while the connection devices 206a and 206b secure these two elements together.

Housing 202 includes an opening 210 to allow one or more connecting wires 208 to enter housing 202. One or more connecting wires 208 connect circuit board assembly 204 with a power source. Thermal interface 205 is disposed between housing 202 and circuit board assembly 204 and is made of a thermally conductive material, which absorbs and dissipates heat produced from various electronic components of the circuit board assembly 204. Examples of thermally conductive material may include a Q-PAD® thermal interface that is supplied by the Bergguist Company having offices at 18930 West 78.sup.th Street, Chanhassen, Minn. Another material that may be employed as the thermally conductive material is Arctic Silver® 5 (AS5) that is supplied by Arctic Silver Inc., having offices at 2230 W. Sunnyside Ave., Suite 6, Visalia, Calif. Additional types of thermally conductive material that may be employed include white-colored paste, thermal grease, phase change materials, and the like. In one embodiment, housing 202 is made of the thermally conductive material such as aluminum, steel, or zinc. In various embodiments, the use of a larger or more efficient thermal interface 205 may manage the increased heat generated from various electronic components of the circuit board assembly 204. In an embodiment, an optically transmitting system (not shown) is attached to housing 202. Although described as including the thermal interface 205, other embodiments exist in which lamp assembly 200 does not include a thermal interface 205.

In an alternate embodiment, a potting material (not shown) may be used on housing 202, to enhance mechanical strength, provide electrical insulation, and enhance vibration and shock resistance of lamp assembly 200. For example, a potting material such as an epoxy, may be used to hold circuit board assembly 204 in place, as well as to seal lamp assembly 200 from water and environmental damage.

Lamp assembly 200 is mounted on the vehicle through hinge 209. In various embodiments, lamp assembly 200 may be mounted on the vehicle through screws, nuts, bolts, rivets, couplings, fasteners, flanges, adhesive material, fastening tabs, soldering joints, and the like.

In the embodiment shown in FIG. 2, lamp assembly 200, including housing 202, is substantially circular in shape and functions as a general illumination device that can be used in a variety of manners in conjunction with the vehicle and the present disclosure is not to be taken as limited to only the mentioned uses. Although not shown, housing 202 may include a flange that provides strength and protection to lamp assembly 200.

The lamp assembly 200 has an exterior portion 222 that includes one or more fins 218 and/or 220. The fins 218, 220 function to provide an increased surface area of the exterior portion 222 in order to more easily dissipate heat from lamp assembly 200 into the surrounding environment.

Figure 7:
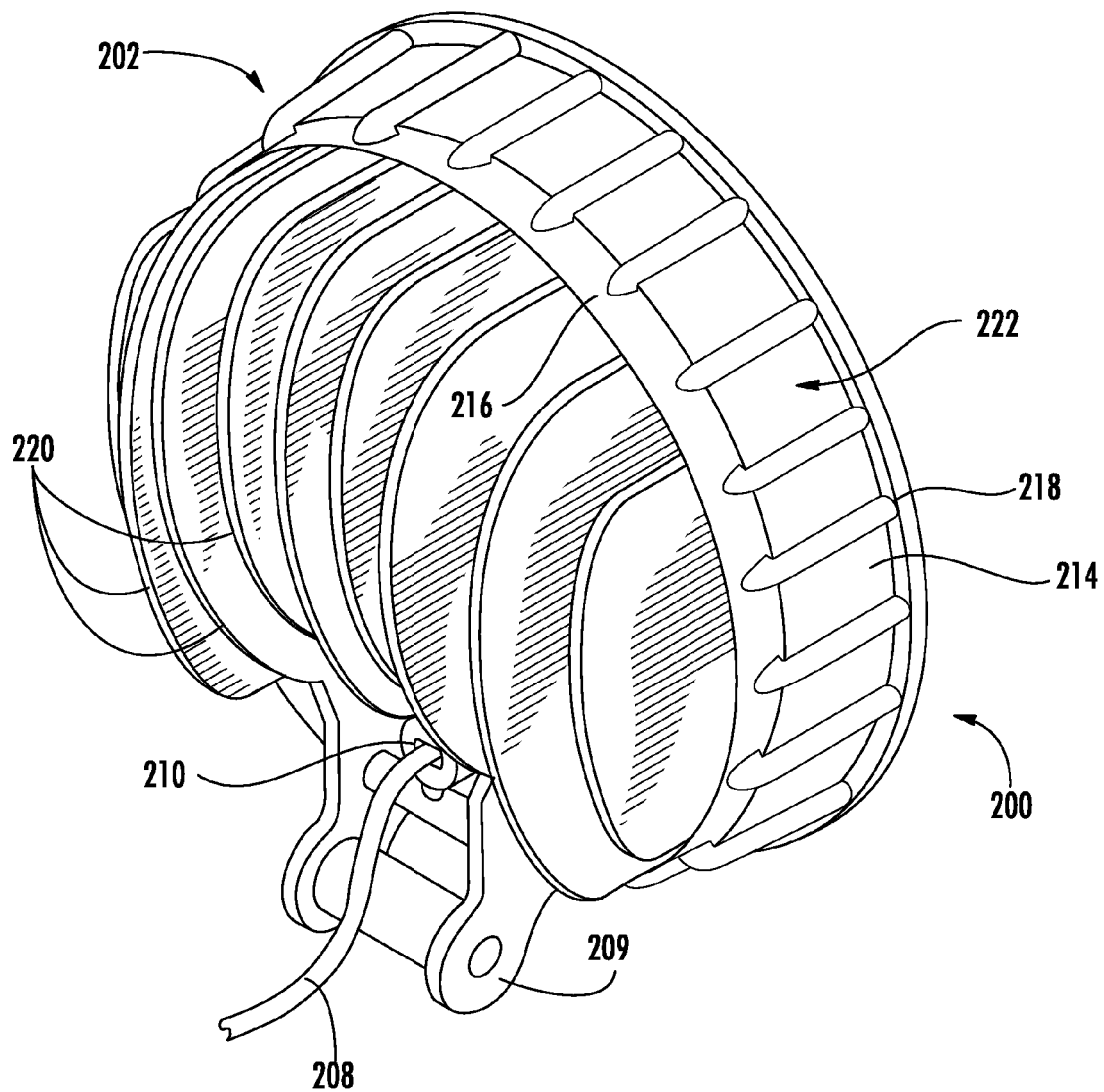
FIG. 7 is a schematic view of a fourth embodiment of a circuit assembly capable of driving the lamp assembly.

With reference now to FIGS. 2 and 7, fins 218 and 220 are located about substantially the entirety of the exterior portion 222. Other arrangements are possible in which less than substantially the entire exterior portion 222 have fins 218, 220. Exterior portion 222 includes an exterior side surface 214, a portion of which is curved in shape. As shown, the entirety of the exterior side surface 214 is curved in shape except for a flat section 215 proximate to the hinge 209. Fins 218 are located on the exterior side surface 214 and extend in such a manner that they are parallel to one another. However, it is to be understood that in accordance with other embodiments fins 218 need not be in parallel relationship to one another. Additionally, fins 218 are spaced from one another an equal distance about the curved portion of the exterior side surface 214. Again, in accordance with other embodiments fins 218 need not be identically spaced from one another about the radial direction.

The exterior portion 222 also includes an exterior end surface 216 that is more clearly shown with reference to FIG. 7. The exterior end surface 216 is generally flat and has fins 220 thereon. However, it is to be understood that the exterior end surface 216 can have one or more portions that are curved in shape in accordance with other embodiments. The fins 220 extend generally over the entirety of the exterior end surface 216, although other arrangements are possible in which fins 220 do not extend over the entirety of the exterior end surface 216. The fins 220 are arranged so as to be generally parallel to one another. However, it can be seen that a center fin 220 and fins 220 engaging the hinge 209 include portions that are not parallel to the rest of fins 220. In this regard, fins 220 are parallel to one another along at least half of the length of the exterior end surface 216, but are not parallel to one another along the entire length of the exterior end surface 216. The fins 220 are shown as being arranged in a vertical fashion such that they extend from the top of the housing 202 to the bottom of the housing 202. However, other arrangements are possible in which fins 220 are not parallel to one another and can extend in any direction of housing 202. From 0 to 50 fins 218 and 220 may be incorporated into lamp assembly 200 in accordance with various embodiments. Fins 220 are spaced an even distance from one another such that an even amount of space is present between adjacent fins 220. However, fins 220 need not be arranged in this fashion in accordance with various embodiments. Additionally, fins 220 can be constructed in a variety of manners. For example, they may be flat, planar elements that are solid. It is to be understood that fins 220 can be variously configured in accordance with different embodiments.

It is to be understood that the specific designation for lamp assembly 200 is for the convenience of the reader and is not to be construed as limiting lamp assembly 200 to specific numbers, sizes, shapes or types of housing 202, circuit board assembly 104, thermal interface 205, connection device 206 and hinge 209 included in lamp assembly 200.

In addition, it is intended that lamp assembly 100 or lamp assembly 200 could also be used on commercial vehicles, trucks, buses, trailer bodies, off-highway vehicles, and agricultural vehicles. In various embodiments, lamp assembly 100 or lamp assembly 200 may be removably secured to the vehicle.

Figure 3:
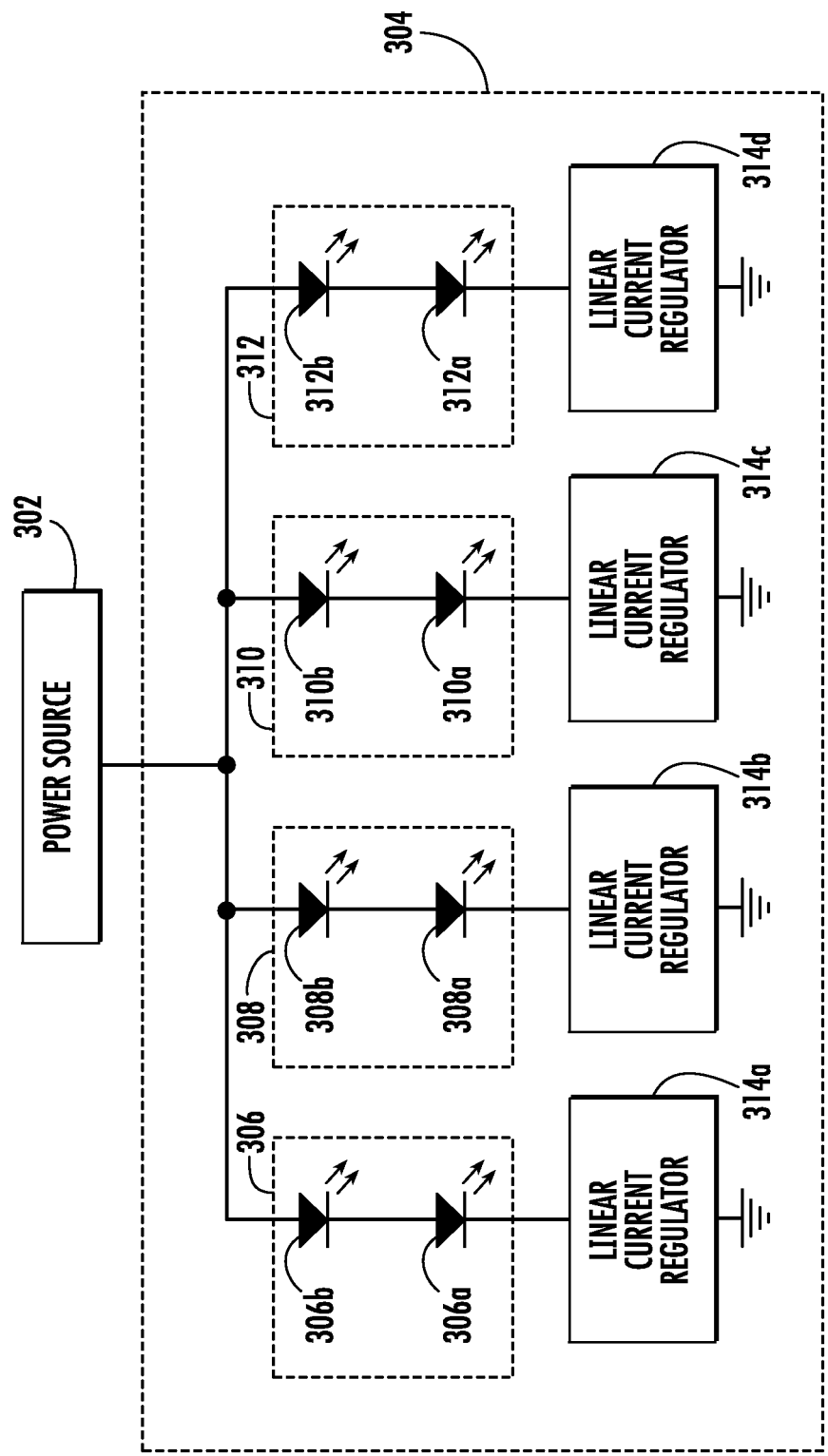
FIG. 3 is a rear perspective view of the lamp assembly illustrated in FIG. 2.

FIG. 3 illustrates a drive circuit 304 of a lamp assembly, which, in the embodiment shown, includes a power source 302. Drive circuit 304 includes a plurality of LED banks, such as LED bank 306, LED bank 308, LED bank 310, and LED bank 312 and a plurality of linear current regulators 314a-314d. LED banks 306, 308, 310 and 312 include a plurality of LEDs, such as LEDs 306a and 306b, LEDs 308a and 308b, LEDs 310a and 310b, LEDs 312a and 312b, respectively.

Power source 302 is connected to LED banks 306, 308, 310 and 312. Power source 302 supplies operating voltage to drive circuit 304. Drive circuit 304 may operate over a wide range of operating voltages. In an embodiment as shown in FIG. 3, the operating voltage of drive circuit 304 is approximately in the range of 7 to 16 Volts. Examples of power source 302 may include, but are not limited to, an electrolytic battery, a solar battery and a fuel cell. LED banks 306, 308, 310 and 312 are connected to each other in parallel arrangement. LEDs 306a and 306b are connected in series with each other. Similarly, LEDs 308a and 308b, LEDs 310a and 310b, and LEDs 312a and 312b are connected in series.

Linear current regulators 314a, 314b, 314c, and 314d are connected in series with LED banks 306, 308, 310 and 312, respectively, and are configured to regulate the amount of electric current through LEDs 306a and 306b, LEDs 308a and 308b, LEDs 310a and 310b, LEDs 312a and 312b, respectively. The amount of electric current is regulated by varying the internal resistance of linear current regulators 314a-d. However, one of ordinary skill in the art will readily appreciate that linear current regulators 314a-d may regulate the electric current at a variety of currents by varying the internal resistance.

In the embodiment shown in FIG. 3, LEDs 306a, 306b, 308a, 308b, 310a, 310b, 312a and 312b are present. It should be understood that any number of LEDs may be used, depending on the standards or specifications one attempts to meet. Further, the specific arrangement of LED banks 306, 308, 310, and 312 and LEDs 306a, 306b, 308a, 308b, 310a 310b, 312a and 312b is merely illustrative and is not to be construed as limiting drive circuit 304 to a specific arrangement. In an embodiment, drive circuit 304 is used in a lamp assembly configured to be mounted on a vehicle. However, in addition, other lamps or electrical devices that operate more efficiently with a constant current may utilize drive circuit 304 as described hereinabove.

Figure 4:
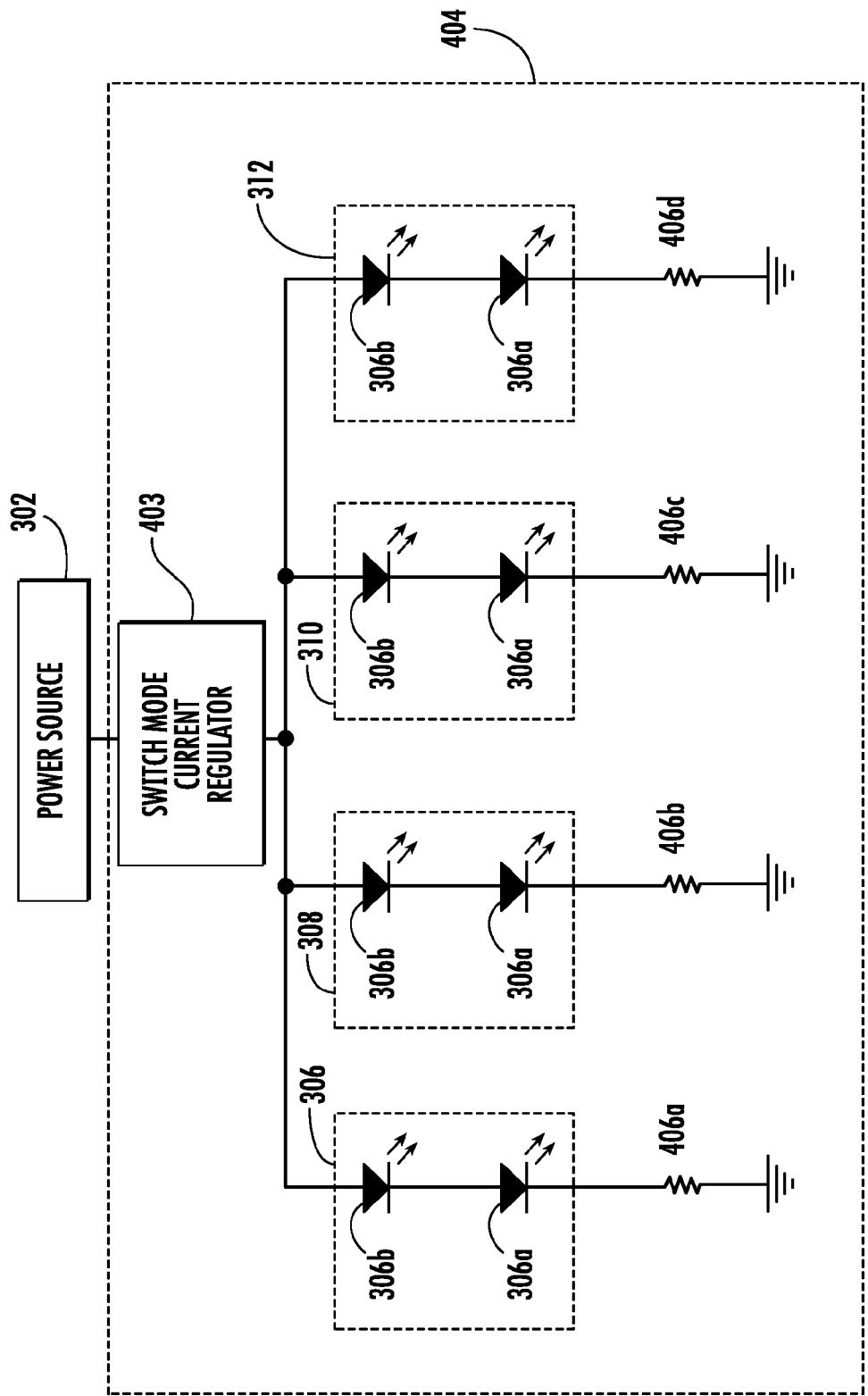
FIG. 4 is a schematic view of a first embodiment of a circuit assembly capable of driving the lamp assembly.

FIG. 4 shows a drive circuit 404 of a lamp assembly, which, in the embodiment shown, includes power source 302. Drive circuit 404 includes LED banks 306, 308, 310 and 312, a switch mode current regulator 403 and one or more ballasting resistors, such as ballasting resistors 406a-d.

Power source 302, LED banks 306, 308, 310, and 312 and LEDs 306a, 306b, 308a, 308b, 310a, 310b, 312a and 312b have been explained in reference to FIG. 3. Ballasting resistors 406a, 406b, 406c and 406d are connected in series with LED banks 306, 308, 310 and 312, respectively to form one or more series arrangements. Ballasting resistors 406a, 406b, 406c and 406d are configured to linearize the voltage characteristics and the amount of electric current flowing through LED banks 306, 308, 310 and 312. The one or more series arrangements are connected in parallel to form a parallel circuit.

Switch mode current regulator 403 is connected in series with the parallel circuit to regulate the amount of electric current flowing through LED banks 306, 308, 310 and 312. In an embodiment, switch mode current regulator 403 includes an inductor and regulates the amount of electric current by varying a duty cycle of the power supplied to the inductor.

It is to be understood that the specific arrangement of LED banks 306, 308, 310, and 312, LEDs 306a, 306b, 308a, 308b, 310a, 310b, 312a, and 312b, and ballasting resistors 406a, 406b, 406c, and 406d is exemplary and is not to be construed as limiting drive circuit 402 to a specific arrangement. In an embodiment, drive circuit 402 is used in a lamp assembly configured to be mounted on a vehicle. However, in addition, other lamps or electrical devices that operate more efficiently with a constant current may utilize drive circuit 402 as described hereinabove.

Figure 5:
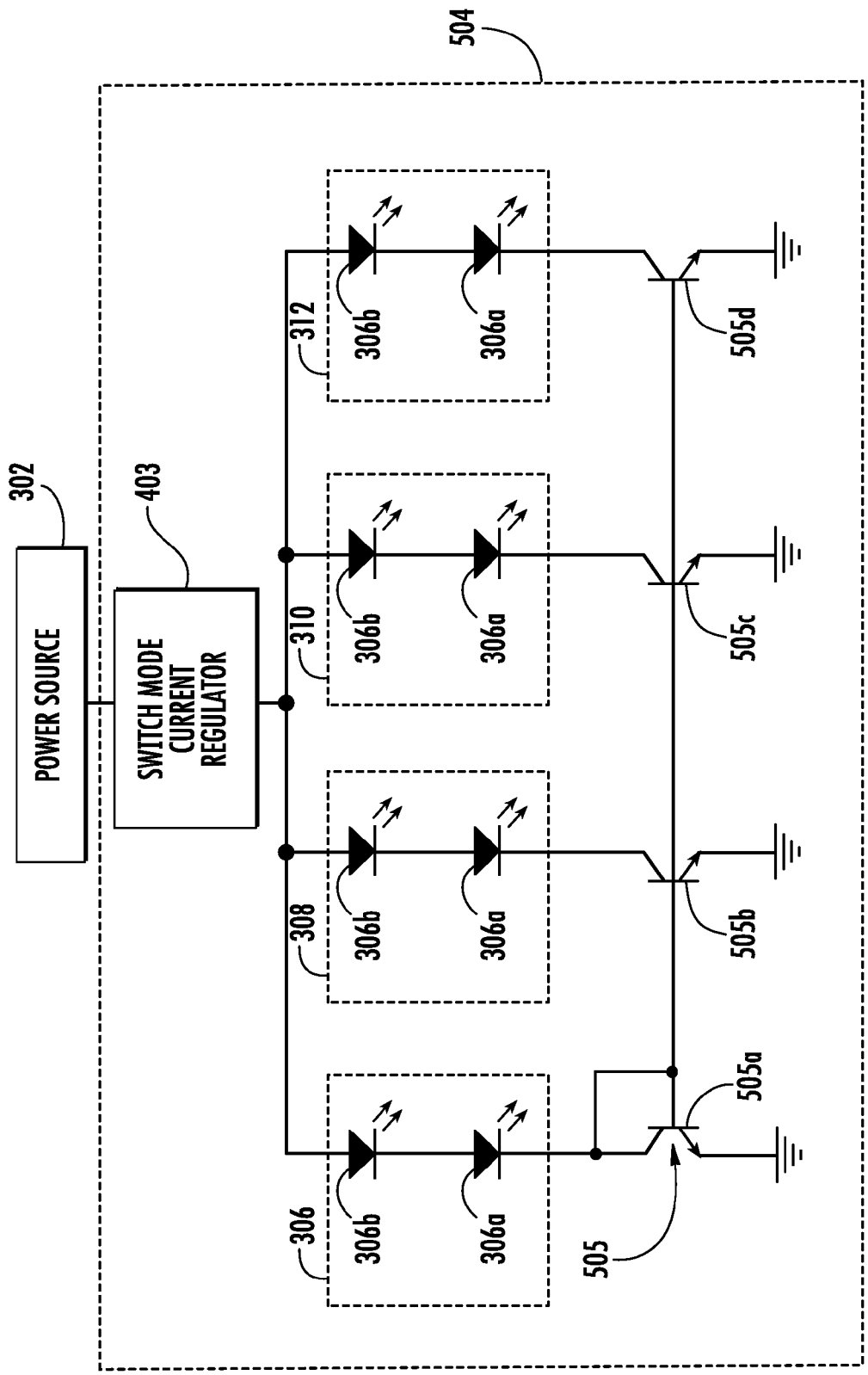
FIG. 5 is a schematic view of a second embodiment of a circuit assembly capable of driving the lamp assembly.

FIG. 5 shows drive circuit 504 of a lamp assembly, which, in the embodiment shown includes power source 302. Drive circuit 504 includes LED banks 306, 308, 310 and 312, a switch mode current regulator 403 and a current minor 505. LED banks 306, 308, 310 and 312 include LEDs 306a and 306b, LEDs 308a and 308b, LEDs 310a and 310b, LEDs 312a and 312b, respectively. Power source 302 is connected with switch mode current regulator 403 and supplies power to drive circuit 502. Details pertaining to power source 302, LED banks 306, 308, 310, and 312 and LEDs 306a, 306b, 308a, 308b, 310a, 310b, 312a, and 312b have been explained in reference to FIG. 3.

Current minor 505 includes a plurality of active devices, such as active devices 505a-d. Examples of one or more active devices may include, but are not limited to, transistors and MOSFETs. In an embodiment, as shown in FIG. 5, the bases of each of active devices 505a-d are coupled together. Coupling of the bases lead to flow of an equal amount of current in LED banks 306, 308, 310, and 312. Active devices 505a, 505b, 505c and 505d are connected in series with LED banks 306, 308, 310 and 312, respectively, to form one or more series arrangements. The one or more series arrangements are connected in parallel to form a parallel circuit. In an embodiment, circuit board assembly 504 may be expanded by coupling additional similar series arrangements of LED banks and active devices in parallel with the parallel circuit. Further, switch mode current regulator 403 is connected in series with the parallel circuit to regulate the amount of electric current flowing through LED banks 306, 308, 310 and 312. Current minor 505 is configured to equally distribute the electric current between LED banks 306, 308, 310 and 312.

It is to be understood that the specific arrangement of LED banks 306, 308, 310, and 312, LEDs 306a, 306b, 308a, 308b, 310a, 310b, 312a, and 312b, and active devices 504a, 504b, 504c and 504d is but a single embodiment and that the drive circuit 502 is not limited to this specific arrangement. In an embodiment, drive circuit 502 is used in a lamp assembly configured to be mounted on a vehicle. However, in addition, other lamps or electrical devices that operate more efficiently with a constant current may utilize drive circuit 502 as described hereinabove.

Figure illustrates a drive circuit 602 of a lamp assembly, which, in the embodiment shown, includes power source 302. Drive circuit 602 includes LED banks 306, 308, 310 and 312, a current mirror 604 and a linear current regulator 606. Current minor 604 includes one or more active devices, such as an active device 604a, 604b and 604c. Examples of one or more active devices may include, but are not limited to, transistors, integrated circuits and vacuum tubes.

Power source 302 is connected with LED banks 306, 308, 310 and 312 and supplies power to drive circuit 602. Linear current regulator 606 is associated with LED bank 306, hereinafter referred to as a first LED bank 306. In an embodiment, linear current regulator 606 is connected in series with first LED bank 306 and is configured to regulate the amount of electric current flowing through LEDs 306a and 306b in first LED bank 306.

Figure 6:
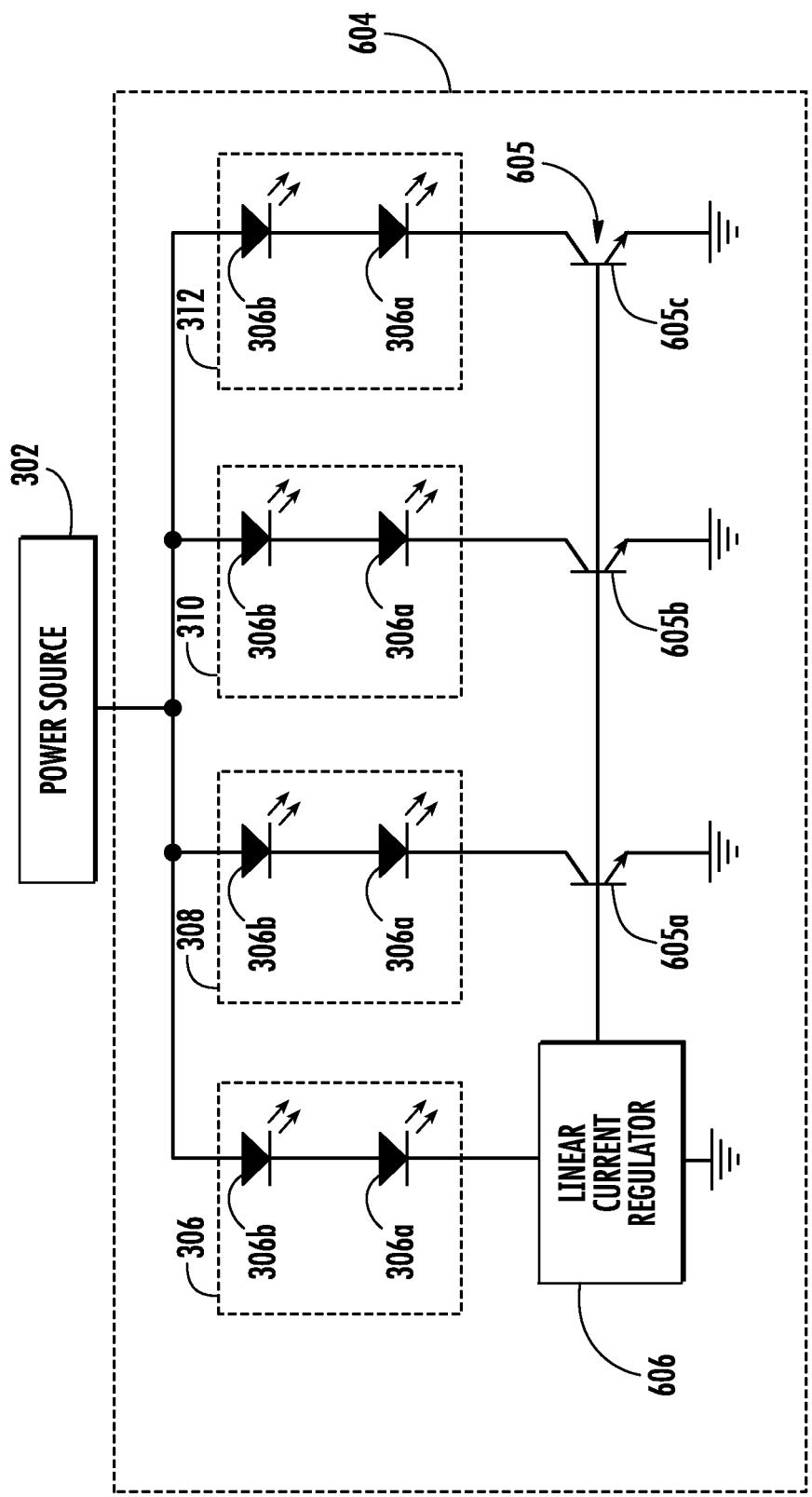
FIG. 6 is a schematic view of a third embodiment of a circuit assembly capable of driving the lamp assembly.

As shown in FIG. 6, the bases of active devices 604a, 604b and 604c are coupled together. Active devices 604a, 604b and 604c affect the current flowing in each LED bank 308, 310, and 312, hereinafter referred to as additional LED banks. Active devices 604a, 604b and 604c affect the current such that the amount of current flowing through each of the additional LED banks is the same as the amount of current flowing through the first LED bank 306.

Details pertaining to power source 302, LED banks 306, 308, 310 and 312 and LEDs 306a, 306b, 308a, 308b, 310a, 310b, 312a and 312b have been explained in reference to FIG. 3. It should be understood that the specific arrangement of LED banks 306, 308, 310, and 312, LEDs 306a, 306b, 308a, 308b, 310a, 310b, 312a, and 312b, linear current regulator 606 and active devices 604a, 604b and 604c is but a single embodiment and that the drive circuit 602 is not limited to this specific arrangement. In an embodiment, drive circuit 602 is used in a lamp assembly configured to be mounted on a vehicle. However, in addition, other lamps or electrical devices that operate more efficiently with a constant current may utilize drive circuit 602 as described hereinabove.

The lamp assembly may be configured so that a resistor drive is not present. Application of a current source in driving the LEDs 306 can result in decreased power dissipation at higher applied voltages. As such, housing 102 or 202 can be sufficient for use as a heat sink in removing heat generated through driving of the LEDs 306. The thermal interface 205 need not be present in certain embodiments as the mechanism of driving the LEDs 306 along with the provision of housing 102, 202 as a heat sink is sufficient to dissipate heat from the lamp assembly. As such, driving of the LEDs 306 though the use of current functions to improve the effectiveness of housing 102, 202 as a heat sink to thus allow housing 102, 202 to be optimally designed with respect to size, shape and material. In this regard, housing 102, 202 can be made smaller or without fins 218, 220 in accordance with other embodiments due to the driving configuration of the LEDs 306. Driving of the LEDs 306 with current may allow for the circuit board assembly 104 to be made of a flame resistant 4 material instead of another more costly material, such as a metal core board. Application of a current source may also reduce the amount of heat needed to be dispersed in lamp assembly 100 or 200 thus increasing the efficiency of the housing 102, 202 when used as a heat sink.

Figure 8:
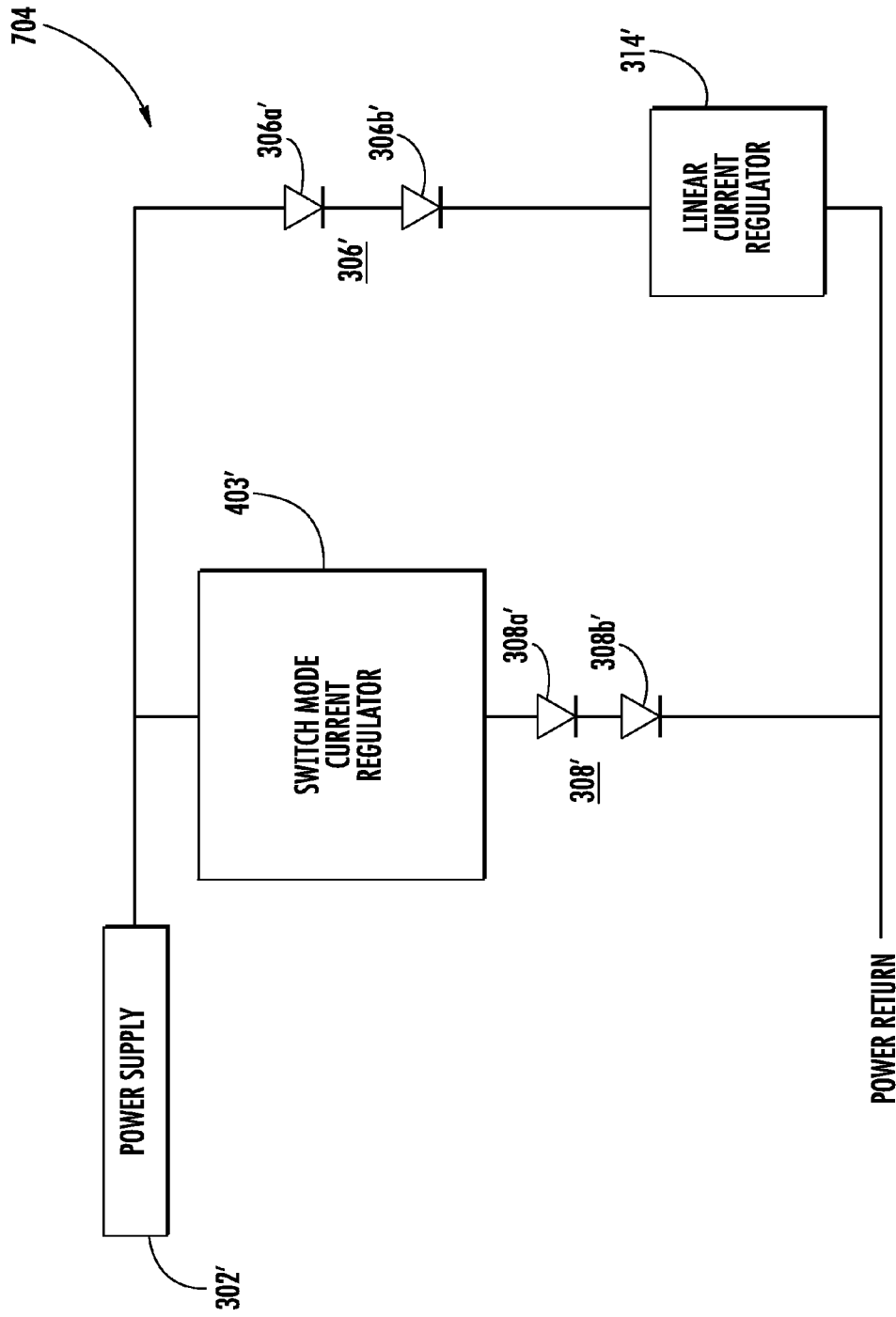
FIG. 8 is a schematic view of a fifth embodiment of a circuit assembly capable of driving the lamp assembly.

A further embodiment, as depicted in FIG. 8, includes a hybrid circuit which incorporates both a switch mode regulator 403' and a linear current regulator 314'. In particular, FIG. 8 illustrates a drive circuit or circuit board 704 of a lamp assembly including a power source 302'. Circuit board 704 includes a plurality of LED banks, such as LED bank 306' and LED bank 308'. LED banks 306' and 308' include a plurality of LEDs, such LEDs 306a' and 306b', and LEDs 308a' and 308b', respectively.

Power source 302' is connected to LED banks 306' and 308'. Power source 302' supplies operating voltage to circuit board 704, which may operate over a wide range of operating voltages, such as in the range of 7 to 16 Volts. Examples of power source 302' may include, but are not limited to, an electrolytic battery, a solar battery and a fuel cell.

Linear current regulator 314' is connected in series with LED bank 306' and is configured to regulate the amount of electric current through LEDs 306a' and 306b'. The amount of electric current is regulated by varying the internal resistance of linear current regulators 314'. One of ordinary skill in the art will readily appreciate that linear current regulator 314' may regulate the electric current at a variety of currents by varying the internal resistance. Both LED banks 306' and 308' receive power from power source 302'. In some instances the voltage from power source 302' may be higher or it may be lower than the voltage needed by the LED banks 306' and 308'. Switch mode current regulator 403' provides voltage translation capability. However, linear current regulator 314' operates only when power source 302' is a higher voltage than LED bank 306' and linear current regulator 314'

In addition, as part of the hybrid circuit, a switch mode current regulator 403' is connected in series in circuit board 704 to regulate the amount of electric current flowing through LED bank 308'. Switch mode current regulator 403' may include an inductor and regulates the amount of electric current by varying the duty cycle of the power supplied to the inductor. In addition, switch mode current regulator 403' regulates the flow of current through light emitting diode banks 306' and 308'by varying the duty cycle of power applied to the inductor of switch mode current regulator 403'.

Further, circuit board 704 may include a current mirror (not shown in FIG. 8) configured to effect the regulated current in light emitting diode banks 306' and 308' such that the same amount of current flows through each one of light emitting diode banks 306' and 308'. More particularly, a current minor could be used in circuit 704 if banks 306' or 308' included additional parallel LED strings. There is no need to have a current mirror between banks 306' or 308' when the current is regulated individually. In the embodiment of FIG. 8, current in banks 306' or 308' are individually and independently controlled in each bank by the regulator in series with it.

Figure 9:
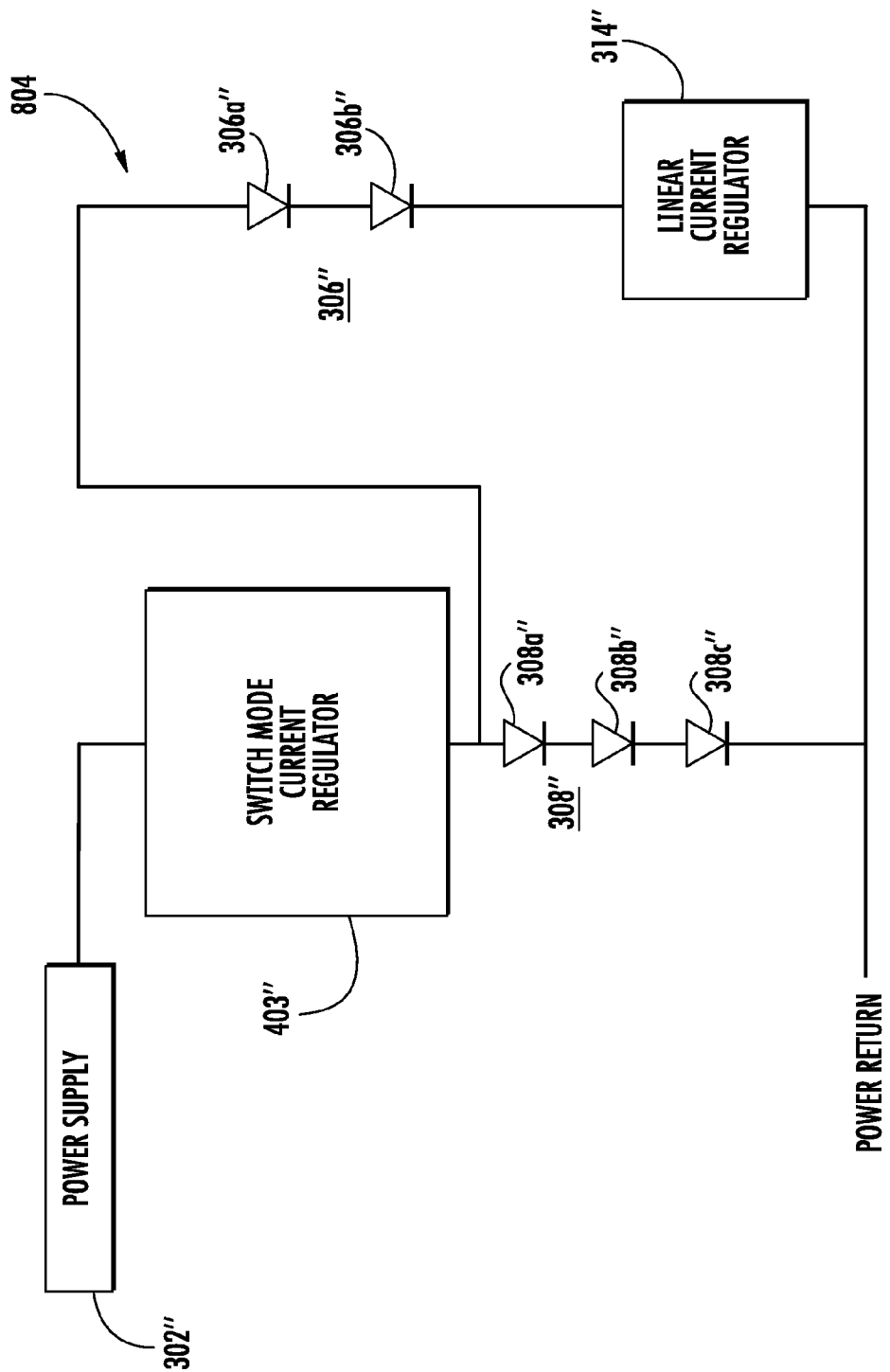
FIG. 9 illustrates an additional embodiment of a circuit assembly for driving the lamp assembly.

FIG. 9 illustrates a drive circuit 804 that provides a switch mode current regulator 403" for providing voltage translation for both LED banks 308" and 306.". LED bank 306" is also in series with a linear current regulator 314". Thus there is no need for an additional switch mode current regulator for LED bank 306." Circuit board 804 provides the option of using different currents and varying numbers of LEDs in each of LED banks 306" and 308". For example, LED bank 306" includes two LEDS, 306a" and 306b", and LED bank 308" includes three LEDS, 308a", 308b", and 308c". In comparison, circuit board or drive circuit 504 (FIG. 5), which uses a single switch mode current regulator 403 and a current divider 505, typically operates when the currents through LED banks 306, 308, 310 and 312 are all equal and they have the same number of LEDs.

While embodiments of the present invention have been described hereinabove, it is to be understood that the subject matter encompassed by way of the claimed invention is not to be limited to such embodiments. On the contrary, it is intended for the scope of the claimed invention to include all alternatives, modifications and equivalents as can be included within the spirit and scope of the following claims.

I claim:

1. A lamp assembly, comprising:
   a housing having an interior portion and an exterior portion that has at least one fin for use in dissipating heat from said housing, wherein said housing functions as a heat sink;
   a power source;
   a circuit board operably connected to the power source;
   a plurality of light emitting diode banks supported by the circuit board, each light emitting diode bank including at least two light emitting diodes connected in series;
   a linear current regulator supported by the circuit board and operably coupled to the power source and at least one of said plurality of light emitting diode banks; and
   a switch mode current regulator supported by the circuit board and operably coupled to at least one of said light emitting diode banks, wherein the linear current regulator and switch mode current regulator reduce an amount of heat to be dissipated from said housing.

2. The lamp assembly as set forth in claim 1, wherein the circuit board is attached to said interior portion of said housing.

3. The lamp assembly as set forth in claim 2, wherein said switch mode current regulator is operably coupled to each one of said plurality of light emitting diode banks.

4. The lamp assembly as set forth in claim 2, wherein said switch mode current regulator regulates a flow of current through at least one of said plurality of light emitting diode banks and said linear current regulator regulates a flow of current through at least another one of said plurality of light emitting diode banks.

5. The lamp assembly as set forth in claim 2, wherein said circuit board is made of flame resistant 4RF.

6. The lamp assembly as set forth in claim 2, wherein a thermal interface is not present between said circuit board and said interior portion of said housing.

7. The lamp assembly as set forth in claim 1, wherein said exterior portion includes an exterior side surface with a curved portion, wherein a plurality of fins for use in dissipating heat from said housing are located on said curved portion of said exterior side surface.

8. The lamp assembly as set forth in claim 7, wherein said plurality of fins on said exterior side surface are parallel to one another.

9. The lamp assembly as set forth in claim 1, wherein said exterior portion includes an exterior end surface, wherein a plurality of fins for use in dissipating heat from said housing are located on said exterior end surface.

10. The lamp assembly as set forth in claim 9, wherein said plurality of fins on said exterior end surface are parallel to one another along at least half of a length of said exterior end surface.

11. A lamp assembly, comprising:
a housing having an interior portion and an exterior portion that has at least one fin for use in dissipating heat from said housing, wherein said housing functions as a heat sink;
a power source;
a circuit board operably connected to the power source;
a plurality of light emitting diode banks supported by the circuit board, each light emitting diode bank including at least two light emitting diodes connected in series;
a linear current regulator supported by the circuit board and operably coupled to the power source and at least one of said plurality of light emitting diode banks; and
a switch mode current regulator supported by the circuit board and operably coupled to at least another one of said light emitting diode banks, wherein the linear current regulator and switch mode current regulator reduce an amount of heat to be dissipated from said housing.

12. The lamp assembly as set forth in claim 11, wherein said circuit board is made of flame resistant 4FR.

13. The lamp assembly as set forth in claim 11, further comprising:
an optically transmitting system attached to said housing, wherein said housing has an interior portion to which said circuit board is attached, and wherein said plurality of light emitting diodes are attached to said circuit board, and wherein said housing has an exterior portion that has at least one fin for use in dissipating heat from said housing.

14. The lamp assembly as set forth in claim 11, wherein said housing further includes an exterior side surface and an exterior end surface, said exterior side surface having a curved portion with a plurality of parallel fins located thereon, and a plurality of fins located on said exterior end surface, wherein said fins are for use in dissipating heat from said housing.

15. The lamp assembly as set forth in claim 11, wherein said plurality of light emitting diodes are arranged into a plurality of light emitting diode banks that each have a plurality of said light emitting diodes connected in series; and wherein said linear current regulator is operably connected to one of said plurality of light emitting diode banks, wherein each one of said linear current regulators is configured for regulating the current flowing through said plurality of light emitting diodes in said light emitting diode bank to which said linear current regulator is associated.

16. The lamp assembly as set forth in claim 11, wherein said switch mode current regulator has an inductor; and wherein said switch mode current regulator is configured for regulating current by varying a duty cycle of power applied to said inductor.

17. A lamp assembly, comprising:
a housing having an interior portion and an exterior portion having an exterior side surface and an exterior end surface, said exterior side surface having a curved portion with a plurality of parallel fins are located thereon, and a plurality of fins located on said exterior end surface, wherein said fins are for use in dissipating heat from said housing;
a power source;
a circuit board operably connected to the power source;
a plurality of light emitting diode banks supported by the circuit board, each light emitting diode bank including at least two light emitting diodes connected in series;
a linear current regulator supported by the circuit board and operably coupled to the power source and at least one of said light emitting diode banks; and
a switch mode current regulator supported by the circuit board and operably coupled to each one of said plurality of light emitting diode banks, wherein the linear current regulator and switch mode current regulator reduce an amount of heat to be dissipated from said housing.

18. The lamp assembly as set forth in claim 17, wherein said switch mode current regulator has an inductor; and wherein said switch mode current regulator is configured for regulating current by varying a duty cycle of power applied to said inductor.

* * * * *